(12) United States Patent
Yokoyama et al.

(10) Patent No.: US 12,428,077 B2
(45) Date of Patent: Sep. 30, 2025

(54) FLOW DEFLECTING DEVICE

(71) Applicant: KABUSHIKI KAISHA TOKAI-RIKA-DENKI-SEISAKUSHO, Aichi-ken (JP)

(72) Inventors: Kazuyuki Yokoyama, Aichi (JP); Suguru Fujisaki, Aichi (JP); Nobuhiro Kudo, Aichi (JP); Kazuya Umino, Aichi (JP); Toshiya Ito, Aichi (JP)

(73) Assignee: KABUSHIKI KAISHA TOKAI-RIKA-DENKI-SEISAKUSHO, Niwa-gun (JP)

( * ) Notice: Subject to any disclaimer, the term of this patent is extended or adjusted under 35 U.S.C. 154(b) by 317 days.

(21) Appl. No.: 17/981,829

(22) Filed: Nov. 7, 2022

(65) Prior Publication Data

US 2023/0143257 A1    May 11, 2023

(30) Foreign Application Priority Data

Nov. 10, 2021    (JP) ................. 2021-183575

(51) Int. Cl.
*B62D 35/00*    (2006.01)
*B62D 35/02*    (2006.01)
*B60R 16/00*    (2006.01)

(52) U.S. Cl.
CPC ........... *B62D 35/005* (2013.01); *B62D 35/02* (2013.01); *B60R 16/005* (2013.01)

(58) Field of Classification Search
CPC .... B62D 35/00; B62D 35/001; B62D 35/005; B62D 35/02
USPC .......................................... 296/180.1, 180.3
See application file for complete search history.

(56) References Cited

U.S. PATENT DOCUMENTS

| | | | | |
|---|---|---|---|---|
| 10,953,933 B2* | 3/2021 | Schmitt | ................ | B62D 35/005 |
| 10,981,611 B2* | 4/2021 | Matthews | ............ | B62D 35/005 |
| 11,040,744 B2* | 6/2021 | Shiga | ..................... | B62D 35/02 |
| 11,155,312 B2* | 10/2021 | Shiga | ..................... | B62D 35/02 |
| 11,161,556 B2* | 11/2021 | Zhang | .................... | B62D 37/02 |
| 11,623,701 B2* | 4/2023 | Tachi | ................... | B62D 35/005 296/180.1 |
| 2017/0101136 A1* | 4/2017 | Zielinski | ................ | B62D 35/02 |
| 2019/0152543 A1 | 5/2019 | Shiga et al. | | |
| 2020/0189668 A1* | 6/2020 | Urbach | ................ | B62D 35/005 |

FOREIGN PATENT DOCUMENTS

JP    2019093785    6/2019

* cited by examiner

*Primary Examiner* — Jason S Daniels
(74) *Attorney, Agent, or Firm* — Dority & Manning, P.A.

(57) ABSTRACT

A flow deflecting device includes a flow deflecting body configured to be deployed and retracted; a rotational mechanism, whereby the flow deflecting body is rotatable in an engaged state at the rotational mechanism; and a limiting mechanism, whereby rotation of the flow deflecting body is limitable in an engaged state at the limiting mechanism. In a case in which the flow deflecting body in a deployed position is acted upon by a first external force, engagement with the rotational mechanism is released, and the flow deflecting body is rotated in the retraction direction in the engaged state at the limiting mechanism. In a case in which the flow deflecting body in a retracted position is acted upon by a second external force, engagement with the limiting mechanism is released, and the flow deflecting body is rotated in the retraction direction in the engaged state at the rotational mechanism.

12 Claims, 3 Drawing Sheets

FLOW DEFLECTING DEVICE

CROSS-REFERENCE TO RELATED APPLICATION

This application claims priority under 35 USC 119 from Japanese Patent Application No. 2021-183575 filed on Nov. 10, 2021, the disclosure of which is incorporated by reference herein in its entirety.

BACKGROUND

Technical Field

The disclosure relates to a flow deflecting device that reduces airflow to a front wheel of a vehicle.

Related Art

Japanese Patent Application Laid-open (JP-A) No. 2019-93785 discloses a flow deflecting device for a vehicle where projections (pushed portions) of a second collar member on a drive device side are inserted by the biasing force of a spring into recesses of a first collar member on a flow deflecting member side, and when an external force acts on the flow deflecting member such that the first collar member is rotated relative to the second collar member, rotation of the flow deflecting member is allowed.

In this flow deflecting device, in order for the flow deflecting member to be rotated due to action of an external force (in order for the first collar member to be rotated relative to the second collar member), a load for disengaging the projections of the second collar member from the recesses of the first collar member counter to the biasing force of the spring is necessary.

SUMMARY

In view of the above circumstances, the present disclosure obtains a flow deflecting device that can inhibit the load for the flow deflecting member to be rotated in a retraction direction due to action of an external force from becoming higher.

A flow deflecting device of a first aspect of the disclosure includes: a flow deflecting body configured to be rotated in a deployment direction so as to become deployed to a front side of a front wheel of a vehicle and reduce airflow to the front wheel, and configured to be rotated in a retraction direction so as to become retracted in a vehicle body; a rotational mechanism, whereby the flow deflecting body is rotatable in an engaged state at the rotational mechanism, such that in a case in which the flow deflecting body in a deployed position is acted upon by an external force and engagement is released, the flow deflecting body is configured to be rotated in the retraction direction, and in a case in which the flow deflecting body in a retracted position is acted upon by an external force, the flow deflecting body is configured to be rotated in the retraction direction in the engaged state at the rotational mechanism; and a limiting mechanism, whereby rotation of the flow deflecting body is limitable in an engaged state at the limiting mechanism, such that in a case in which the flow deflecting body in the retracted position is acted upon by an external force and engagement is released, the flow deflecting body is configured to be rotated in the retraction direction, and in a case in which the flow deflecting body in the deployed position is acted upon by an external force, the flow deflecting body is configured to be rotated in the retraction direction in the engaged state at the limiting mechanism.

A flow deflecting device of a second aspect of the disclosure is the flow deflecting device of the first aspect of the disclosure, wherein, in a state in which the flow deflecting body is disposed in the deployed position, the rotational mechanism limits rotation of the flow deflecting body in the retraction direction and the limiting mechanism limits rotation of the flow deflecting body in the deployment direction.

A flow deflecting device of a third aspect of the disclosure is the flow deflecting device of the first aspect or the second aspect of the disclosure, wherein, in a case in which the flow deflecting body is disposed in the retracted position, the rotational mechanism limits rotation of the flow deflecting body in the deployment direction and the limiting mechanism limits rotation of the flow deflecting body in the retraction direction.

A flow deflecting device of a fourth aspect of the disclosure is the flow deflecting device of any one of the first aspect to the third aspect of the disclosure, wherein, in a case in which the flow deflecting body in the deployed position is rotated in the retraction direction due to action of an external force, the limiting mechanism allows rotation of the flow deflecting body.

A flow deflecting device of a fifth aspect of the disclosure is the flow deflecting device of any one of the first aspect to the fourth aspect of the disclosure, wherein, when the flow deflecting body in the retracted position is rotated in the retraction direction due to action of an external force, the rotational mechanism allows rotation of the flow deflecting body.

In the flow deflecting device of the first aspect of the disclosure, in a case in which the flow deflecting body is rotated in the deployment direction, the flow deflecting body becomes deployed to the front side of the front wheel of the vehicle and reduces airflow to the front wheel. Moreover, when the flow deflecting body is rotated in the retraction direction, the flow deflecting body becomes retracted in the vehicle body.

Furthermore, the rotational mechanism is engaged and the flow deflecting body is rotated. Moreover, the limiting mechanism is engaged and rotation of the flow deflecting body is limited.

Here, in a case in which the flow deflecting body in the deployed position is acted upon by an external force such that the engagement of the rotational mechanism is released in a state in which the limiting mechanism is engaged with the flow deflecting body, the flow deflecting body is rotated in the retraction direction.

The engagement of the limiting mechanism with the flow deflecting body does not become released, so the load for the flow deflecting body to be rotated in the retraction direction can be inhibited from becoming higher.

Moreover, in a case in which the flow deflecting body in the retracted position is acted upon by an external force such that the engagement of the limiting mechanism is released in a state in which the rotational mechanism is engaged with the flow deflecting body, the flow deflecting body is rotated in the retraction direction. The engagement of the rotational mechanism with the flow deflecting body does not become released, so the load for the flow deflecting body to be rotated in the retraction direction can be inhibited from becoming higher.

In the flow deflecting device of the second aspect of the disclosure, in a case in which the flow deflecting body is disposed in the deployed position, the rotational mechanism limits rotation of the flow deflecting body in the retraction direction and the limiting mechanism limits rotation of the flow deflecting body in the deployment direction. Rotation of the flow deflecting body in the deployment direction and the retraction direction can be limited and rattling of the flow deflecting body can be inhibited.

In the flow deflecting device of the third aspect of the disclosure, in a case in which the flow deflecting body is disposed in the retracted position, the rotational mechanism limits rotation of the flow deflecting body in the deployment direction and the limiting mechanism limits rotation of the flow deflecting body in the retraction direction. Rotation of the flow deflecting body in the deployment direction and the retraction direction can be limited and rattling of the flow deflecting body can be inhibited.

In the flow deflecting device of the fourth aspect of the disclosure, in a case in which the flow deflecting body in the deployed position is rotated in the retraction direction due to the action of an external force, the limiting mechanism allows rotation of the flow deflecting body. The load for the flow deflecting body to be rotated in the retraction direction can be effectively inhibited from becoming higher.

In the flow deflecting device of the fifth aspect of the disclosure, in a case in which the flow deflecting body in the retracted position is rotated in the retraction direction due to the action of an external force, the rotational mechanism allows rotation of the flow deflecting body. The load for the flow deflecting body to be rotated in the retraction direction can be effectively inhibited from becoming higher.

DETAILED DESCRIPTION

Figure 1:
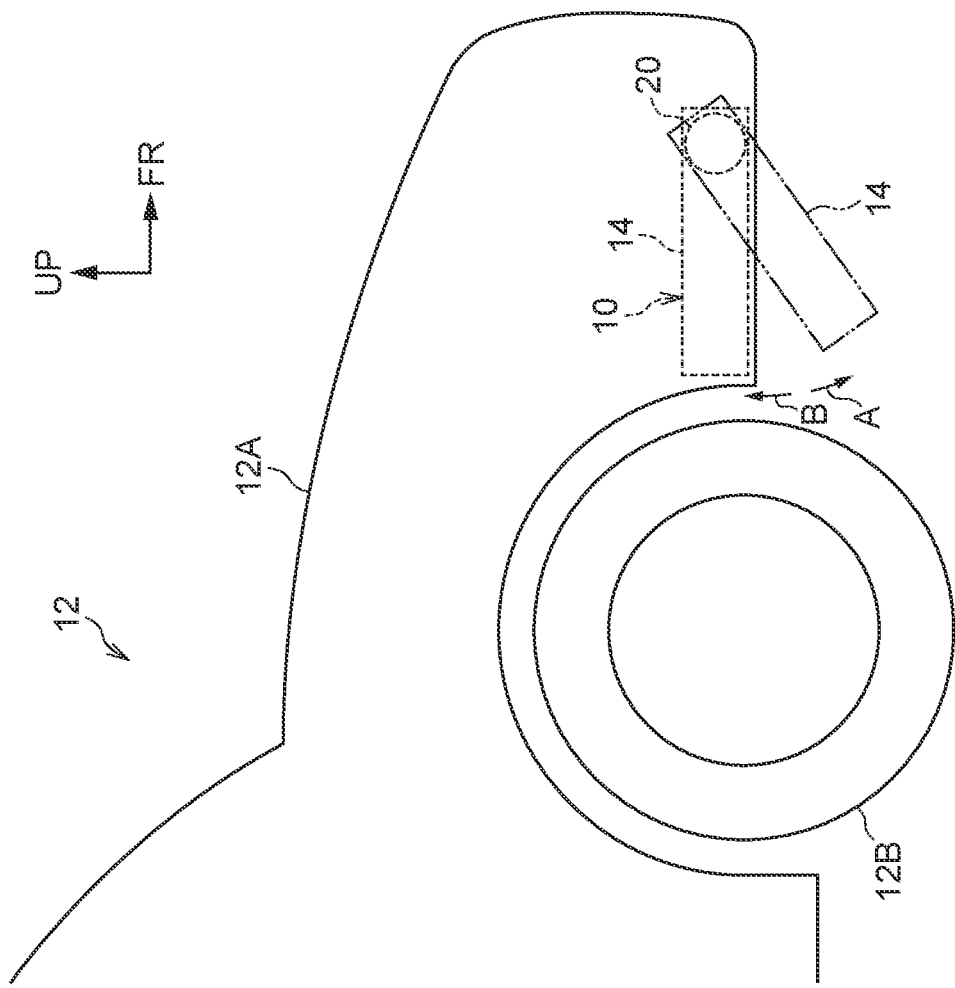
FIG. 1 is a side view showing a front portion of a vehicle in an embodiment of the disclosure as viewed from outside in the vehicle width direction.

In FIG. 1 a front portion of a vehicle 12 in an embodiment of the disclosure is shown in a side view as viewed from outside in the vehicle width direction (the vehicle right direction), and in FIG. 2 a flow deflecting device 10 pertaining to the embodiment is shown in an exploded perspective view as viewed from inside in the vehicle width direction and below. In the drawings, arrow FR indicates a forward direction of the vehicle, arrow OUT indicates an outward direction in the vehicle width direction (a rightward direction of the vehicle), and arrow UP indicates an upward direction.

As shown in FIG. 1, the flow deflecting device 10 pertaining to the embodiment is installed inside a front end portion of a vehicle body 12A and is disposed on the front side of a front wheel 12B of the vehicle 12.

Figure 2:
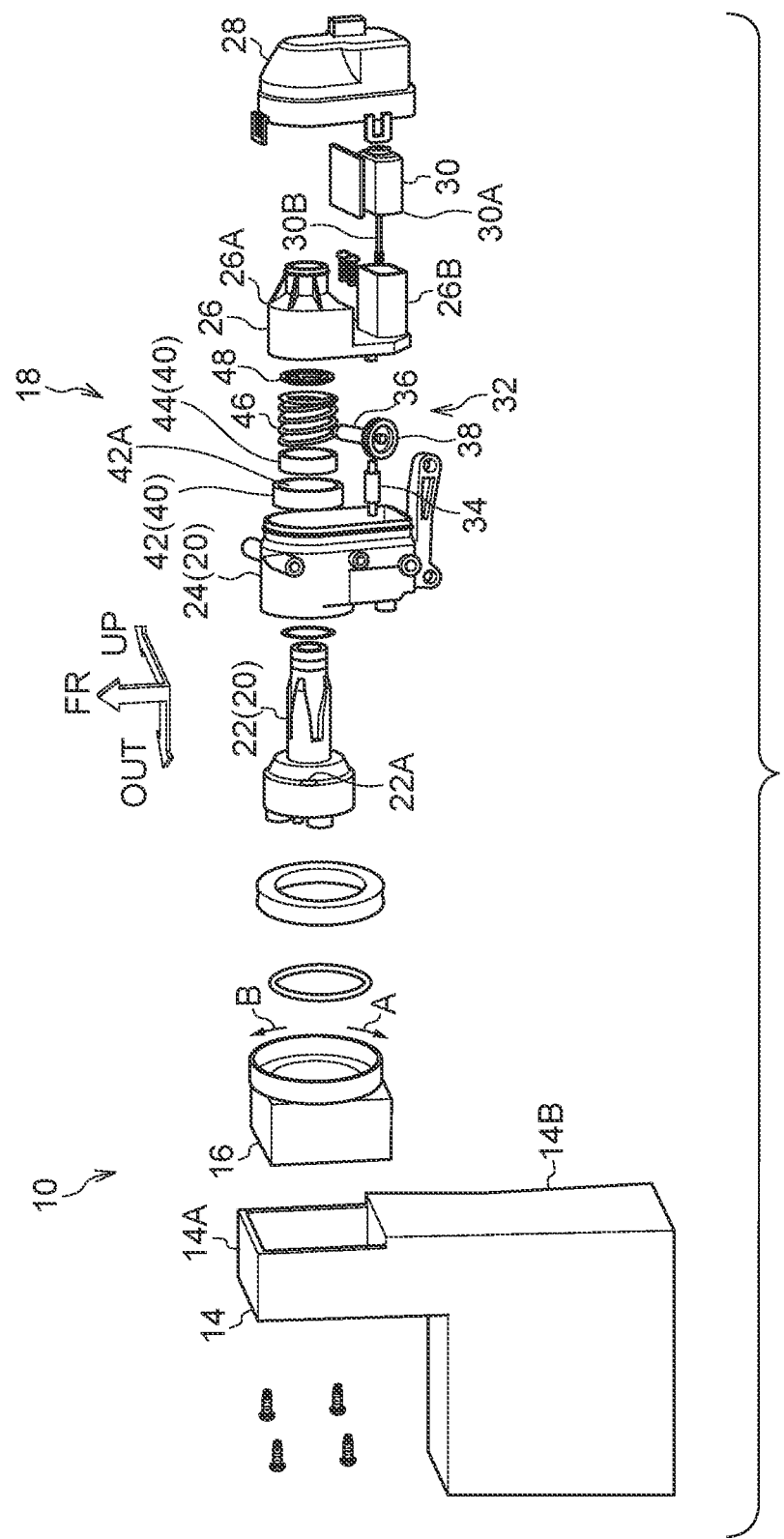
FIG. 2 is an exploded perspective view showing a flow deflecting device pertaining to the embodiment of the disclosure as viewed from inside in the vehicle width direction and below.

As shown in FIG. 2, the flow deflecting device 10 is provided with a flow deflecting body 14 (an air spat) made of resin, and the flow deflecting body 14 is disposed in a retracted position (the position represented by the dashed lines in FIG. 1). The vehicle front end portion of the flow deflecting body 14 is configured as an attachment box 14A substantially in the shape of a cuboid box and serving as an attachment portion, and the inside of the attachment box 14A opens inward in the vehicle width direction. The portion of the flow deflecting body 14 on the vehicle rear side of the attachment box 14A is configured as a flow deflecting portion 14B substantially in the shape of a cuboid box, and the flow deflecting portion 14B is integrated at its inner end portion in the vehicle width direction with the attachment box 14A and the inside of the flow deflecting portion 14B opens upward and in the vehicle rearward direction.

An attachment 16 that is made of resin, has an outer shape substantially in the shape of a rectangular tube, and serves as an attachment member is mated with the inside of the attachment box 14, and the attachment 16 is secured at its peripheral wall to a bottom wall (outer wall in the vehicle width direction) of the attachment box 14A. The inside of the attachment 16 is substantially in the shape of a cylinder and opens to both sides in the vehicle width direction. A disc-shaped partition wall (not shown in the drawings) is integrally formed inside the attachment 16, and the partition wall partitions the inside of the attachment 16 into a vehicle width direction outer portion and a vehicle width direction inner portion.

A drive device 18 is attached to the attachment 16, and the drive device 18 is secured to the inside of the front end portion of the vehicle body 12A.

The drive device 18 is provided with a stand 22 that is made of metal, is substantially in the shape of a cylinder, and serves as a limit receiving member (rotating shaft) configuring a limiting mechanism 20, and an outer end portion in the vehicle width direction of the stand 22 is coaxially increased in diameter. An outer end portion in the vehicle width direction of the stand 22 is mated with the inside of the attachment 16 and secured to the partition wall of the attachment 16, and the attachment 16 and the flow deflecting body 14 are configured to be rotatable in a deployment direction A and a retraction direction B integrally with the stand 22 about the stand 22 as a central axis.

On the outer end portion in the vehicle width direction of the stand 22, plural (in this embodiment, four) limiting projections 22A (see FIG. 3A) having trapezoidal cross-sectional shapes and serving as limit receiving portions are integrally formed, and the plural limiting projections 22A are arranged equidistantly in the circumferential direction of the stand 22. The limiting projections 22A project inward in the vehicle width direction and are curved along the circumferential direction of the stand 22. The deployment direction A-side surfaces of the limiting projections 22A are perpendicular to the circumferential direction of the stand 22, and the retraction direction B-side surfaces of the limiting projections 22A are inclined in a direction inward in the vehicle width direction heading in the deployment direction A.

On an inner side in the vehicle width direction of the attachment 16, a case 24 that is made of resin, is substantially in the shape of a cuboid box, and serves as a limiting member configuring the limiting mechanism 20 is disposed, and the inside of the case 24 opens inward in the vehicle width direction. The stand 22 runs through and is mated with the vehicle front portion of a bottom wall (vehicle width direction outer wall) of the case 24, and the stand 22 is rotatably supported on the bottom wall of the case 24 and movement of the stand 22 inward in the vehicle width direction is regulated by the bottom wall of the case 24.

In the bottom wall of the case 24, plural (in this embodiment, four) limiting recesses 24A (see FIG. 3A) having trapezoidal cross-sectional shapes and serving as limiting portions are formed around the stand 22, and the plural limiting recesses 24A are arranged equidistantly relative to the circumferential direction of the stand 22. The limiting recesses 24A open outward in the vehicle width direction and extend in the circumferential direction of the stand 22. The deployment direction A-side end surfaces of the limiting recesses 24A are perpendicular to the circumferential direction of the stand 22, and the retraction direction B-side end surfaces of the limiting recesses 24A are inclined in a direction inward in the vehicle width direction heading in the deployment direction A. The limiting projections 22A of the stand 22 are inserted into (engaged with) the limiting recesses 24A, and the limiting projections 22A are brought into abutment with the retraction direction B-side end surfaces of the limiting recesses 24A so that rotation of the stand 22 in the retraction direction B is limited.

Inside an inner portion in the vehicle width direction of the case 24, a motor base 26 made of resin and serving as a retention member is secured. At the vehicle front portion of the motor base 26, a housing tube 26A substantially in the shape of a bottomed cylindrical tube is formed, and the inside of the housing tube 26A opens outward in the vehicle width direction and the stand 22 is coaxially housed inside the housing tube 26A. On the vehicle rear portion of the motor base 26, a retention tube 26B substantially in the shape of a bottomed elliptical tube is integrally formed, and the inside of the retention tube 26B opens inward in the vehicle width direction.

At an inner side in the vehicle width direction of the case 24 and the motor base 26, a cover 28 that is made of resin, is substantially in the shape of a cuboid box, and serves as a cover member is provided, and the inside of the cover 28 opens outward in the vehicle width direction. An inner end portion in the vehicle width direction of the case 24 is mated with and secured to the inside in the vehicle width direction of an outer end portion of the cover 28, and the cover 28 covers the inner side in the vehicle width direction of the case 24 and the motor base 26.

The case 24 and the cover 28 are secured to the inside of the front end portion of the vehicle body 12A, whereby the drive device 18 is secured to the inside of the front end portion of the vehicle body 12A.

In a space between the case 24 and the cover 28, a motor 30 serving as a drive device is provided. The motor 30 is provided with a body portion 30A substantially in the shape of an elliptical cylinder, and the body portion 30A is fitted from an inner side in the vehicle width direction into and retained inside the retention tube 26B of the motor base 26. An output shaft 30B extends outward in the vehicle width direction from the body portion 30A, and the output shaft 30B extends through a bottom wall (vehicle width direction outer wall) of the retention tube 26B to an outer side in the vehicle width direction of the motor base 26. The motor 30 is driven to rotate the output shaft 30B.

The case 24 is provided with a gear mechanism 32.

The gear mechanism 32 is provided with a primary worm 34 made of resin on an outer side in the vehicle width direction of the motor 30, and an outer end portion of the primary worm 34 is supported so as to be freely rotatable on the bottom wall of the case 24. The output shaft 30B of the motor 30 is coaxially inserted from an inner side in the vehicle width direction into the primary worm 34, and when the output shaft 30B is rotated, the primary worm 34 is rotated integrally with the output shaft 30B.

The gear mechanism 32 is also provided with an output worm 36 made of metal on the upper side of the primary worm 34, and the output worm 36 is supported so as to be freely rotatable between the bottom wall of the case 24 and the motor base 26. On the lower side of the output worm 36, a primary gear 38 (a worm wheel) made of resin is coaxially supported, and the primary gear 38 is rotated integrally with the output worm 36. The primary gear 38 is meshed with the primary worm 34, and when the primary worm 34 is rotated, the primary gear 38 and the output worm 36 are integrally rotated.

The gear mechanism 32 is also provided with an output gear 42 (a worm wheel) made of metal and serving as a rotational member configuring a rotational mechanism 40 on the vehicle front side of the output worm 36. The stand 22 coaxially runs through and is mated with the output gear 42, and the output gear 42 is rotatably supported on the stand 22. The output gear 42 is configured to be movable in the vehicle width direction (axial direction) relative to the stand 22, and the output gear 42 is brought into abutment from an inner side in the vehicle width direction with the bottom wall of the case 24 so that movement of the output gear 42 outward in the vehicle width direction is regulated. The output gear 42 is meshed with the output worm 36 so that rotation of the output gear 42 is limited, and when the output worm 36 is rotated, the output gear 42 is rotated.

A cylindrical recess 42A is coaxially formed at an inner surface in the vehicle width direction of the output gear 42, and the recess 42A opens inward in the vehicle width direction. At an outer surface in the vehicle width direction of the recess 42A, plural (in this embodiment, four) rotational recesses 42B (see FIG. 3A) serving as rotational portions are formed, and the plural rotational recesses 42B are arranged equidistantly in the circumferential direction of the output gear 42. The rotational recesses 42B open inward in the vehicle width direction and extend in the circumferential direction of the output gear 42. The rotational recesses 42B have trapezoidal cross-sectional shapes, and both end surfaces of each of the rotational recesses 42B are inclined in a direction inward in the vehicle width direction heading toward circumferential direction outer sides of the output gear 42.

At an inner side in the vehicle width direction of the output gear 42, a clutch 44 that is made of metal, is substantially in the shape of a cylindrical tube, and serves as a rotation receiving member configuring the rotational mechanism 40 is provided. The stand 22 coaxially runs through the clutch 44, and the clutch 44 is supported thereon, so as to be integrally rotatable with the stand 22. The clutch 44 is configured to be movable in the vehicle width direction relative to the stand 22, and is fitted inside the recess 42A of the output gear 42.

On an outer surface in the vehicle width direction of the clutch 44, plural (in this embodiment, four) rotational projections 44A (see FIG. 3A) serving as rotation receiving portions are formed, and the plural rotational projections 44A are arranged equidistantly in the circumferential direction of the clutch 44. The rotational projections 44A project outward in the vehicle width direction and are curved along the circumferential direction of the clutch 44. The rotational projections 44 have trapezoidal cross-sectional shapes, and both side surfaces of each of the rotational projections 44A are inclined in a direction outward in the vehicle width direction heading toward the clutch 44 circumferential direction inner sides. The rotational projections 44A are inserted into (engaged with) rotational recesses 42B of the output gear 42, and the rotational projections 44A are brought into abutment with the deployment direction A-side end surfaces of the rotational recesses 42B so that rotation of the clutch 44 in the deployment direction A is limited.

The stand 22 is coaxially inserted into a compression coil spring 46 made of metal and serving as a biasing member on an inner side in the vehicle width direction of the clutch 44. A push nut 48 that is made of metal, is substantially in the shape of an annular disc, and serves as an engagement member is mated with and secured to an inner end portion in the vehicle width direction of the stand 22, and the compression coil spring 46 bridges the push nut 48 and the clutch 44. The compression coil spring 46 is compressed in the axial direction, biases the push nut 48 and the stand 22 inward in the vehicle width direction, and biases the clutch 44 in the direction of the output gear 42 (outward in the vehicle width direction).

Next, the action of this embodiment will be described.

In the flow deflecting device 10 having the above configuration, when, in the drive device 18, the motor 30 is forwardly driven so that the output shaft 30B, the primary worm 34, the primary gear 38, and the output worm 36 are rotated, the output gear 42 is rotated in the deployment direction A and the retraction direction B-side end surfaces of the rotational recesses 42B of the output gear 42 are brought into abutment with the rotational projections 44A of the clutch 44. The clutch 44, the stand 22, and the attachment 16 are rotated integrally with the output gear 42 in the deployment direction A, and the flow deflecting body 14 is rotated in the deployment direction A. Moreover, the limiting projections 22A of the stand 22 are brought into abutment with the deployment direction A-side end surfaces of the limiting recesses 24A of the case 24 so that rotation of the stand 22 in the deployment direction A is limited (see FIG. 3B), whereby rotation of the flow deflecting body 14 in the deployment direction A is limited and the flow deflecting body 14 is disposed in a deployed position (the position represented by the long dashed double-short dashed lines in FIG. 1). The flow deflecting portion 14B of the flow deflecting body 14 is disposed on the vehicle front side of the front wheel 12B of the vehicle 12 on the underside of the vehicle body 12A and reduces the headwind (airflow) in the direction of the front wheel 12B created by the forward motion of the vehicle 12 (deflects the headwind toward the underside of the front wheel 12B), whereby an increase in air pressure on the vehicle front side of the front wheel 12B is inhibited and the air resistance and lift of the vehicle 12 are reduced.

Conversely, when, in the drive device 18, the motor 30 is reversely rotated so that the output shaft 30B, the primary worm 34, the primary gear 38, and the output worm 36 are rotated, the output gear 42 is rotated in the retraction direction B and the deployment direction A-side end surfaces of the rotational recesses 42B of the output gear 42 are brought into abutment with the rotational projections 44A of the clutch 44. The clutch 44, the stand 22, and the attachment 16 are rotated integrally with the output gear 42 in the retraction direction B, and the flow deflecting body 14 is rotated in the retraction direction B. Moreover, the limiting projections 22A of the stand 22 are brought into abutment with the retraction direction B-side end surfaces of the limiting recesses 24A of the case 24 so that rotation of the stand 22 in the retraction direction B is limited (see FIG. 3A), whereby rotation of the flow deflecting body 14 in the retraction direction B is limited and the flow deflecting body 14 is disposed in the retracted position (the position represented by the dashed lines in FIG. 1).

Furthermore, when the flow deflecting body 14 is disposed in the deployed position, when an external force equal to or greater than a predetermined value in the upward direction acts on the airflow deflecting portion 14B of the flow deflecting body 14 from a bump on the surface on which the vehicle 12 is traveling, the clutch 44 is moved inward in the vehicle width direction counter to the biasing force of the compression coil spring 46 and at the same time the rotational projections 44A of the clutch 44 become disengaged (their engagement is released) in the retraction direction B from the rotational recesses 42B of the output gear 42. Together with this, the limiting projections 22A of the stand 22 are rotated in the retraction direction B in the limiting recesses 24A of the case 24 (see the long dashed double-short dashed lines in FIG. 3B). For this reason, the flow deflecting body 14, the attachment 16, the stand 22, and the clutch 44 are rotated in the retraction direction B so that the flow deflecting body 14, the attachment 16, and the drive device 18 are protected.

Thereafter, when the flow deflecting body 14 is rotatable in the deployment direction A, when the motor 30 is reversely driven, the output gear 42 is rotated in the retraction direction B so that the rotational projections 44A of the clutch 44 are brought into abutment with the retraction direction B-side end surfaces of the rotational recesses 42B of the output gear 42. Then, the motor 30 is forwardly driven, whereby the output gear 42, the clutch 44, and the stand 22 are rotated in the deployment direction A so that the flow deflecting body 14 is rotated (returned) to the deployed position.

Moreover, when the flow deflecting body 14 is disposed in the retracted position, when an external force equal to or greater than a predetermined value in the upward direction acts on the airflow deflecting portion 14B of the flow deflecting body 14 from a bump on the surface on which the vehicle 12 is traveling, the stand 22 is moved outward in the vehicle width direction counter to the biasing force of the compression coil spring 46 and at the same time the limiting projections 22A of the stand 22 become disengaged (their engagement is released) in the retraction direction B from the limiting recesses 24A of the case 24. Together with this, the rotational projections 44A of the clutch 44 are rotated in the retraction direction B in the rotational recesses 42B of the output gear 42 (see the long dashed double-short dashed lines in FIG. 3A). The flow deflecting body 14, the attachment 16, the stand 22, and the clutch 44 are rotated in the retraction direction B so that the flow deflecting body 14, the attachment 16, and the drive device 18 are protected.

Thereafter, when the flow deflecting body 14 is rotatable in the deployment direction A, when the motor 30 is forwardly driven, the output gear 42 is rotated in the deployment direction A. The retraction direction B-side end surfaces of the rotational recesses 42B of the output gear 42 are brought into abutment with the rotational projections 44A of the clutch 44 so that the clutch 44 and the stand 22 are rotated integrally with the output gear 42 in the deployment direction A, whereby the flow deflecting body 14 is rotated (returned) to the retracted position. Then, the motor 30 is reversely driven, whereby the output gear 42 is rotated in the retraction direction B so that the deployment direction A-side end surfaces of the rotational recesses 42B of the output gear 42 are brought into abutment with the rotational projections 44A of the clutch 44.

When the flow deflecting body 14 in the deployed position is rotated in the retraction direction B due to action of an external force, the rotational projections 44A of the clutch 44 become disengaged from the rotational recesses 42B of the output gear 42 (see the long dashed double-short dashed lines in FIG. 3B) in a state in which the limiting projections 22A of the stand are inserted into the limiting recesses 24A of the case 24. The limiting projections 22A do not become disengaged from the limiting recesses 24A, so the load for the flow deflecting body 14 to be rotated in the retraction direction B from the deployed position (the force counter to the biasing force of the compression coil spring 46) can be inhibited from becoming higher.

Moreover, when the flow deflecting body 14 in the deployed position is rotated in the retraction direction B due to action of an external force, the limiting projections 22A of the stand 22 are rotated without being hindered by the limiting recesses 24A of the case 24 (the limiting recesses 24A allow rotation of the limiting projections 22A). For this reason, the load for the flow deflecting body 14 to be rotated in the retraction direction B from the deployed position can be effectively inhibited from becoming higher.

Figure 3A:
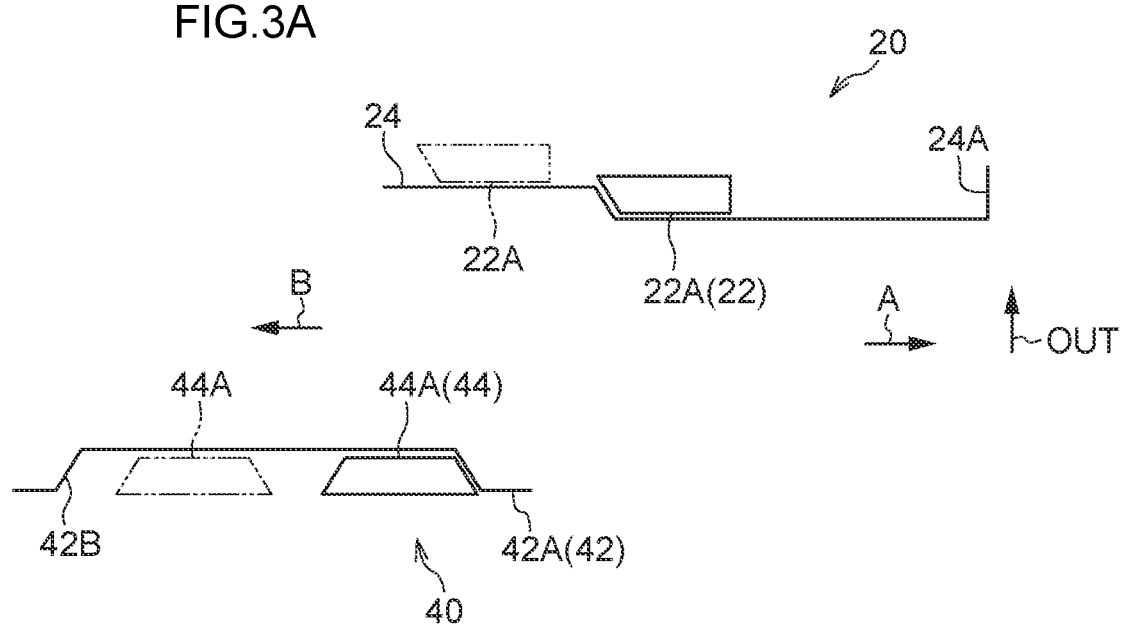
FIG. 3A is a sectional view showing main parts of the flow deflecting device pertaining to the embodiment of the disclosure and shows when a flow deflecting body is disposed in a retracted position.
Figure 3B:
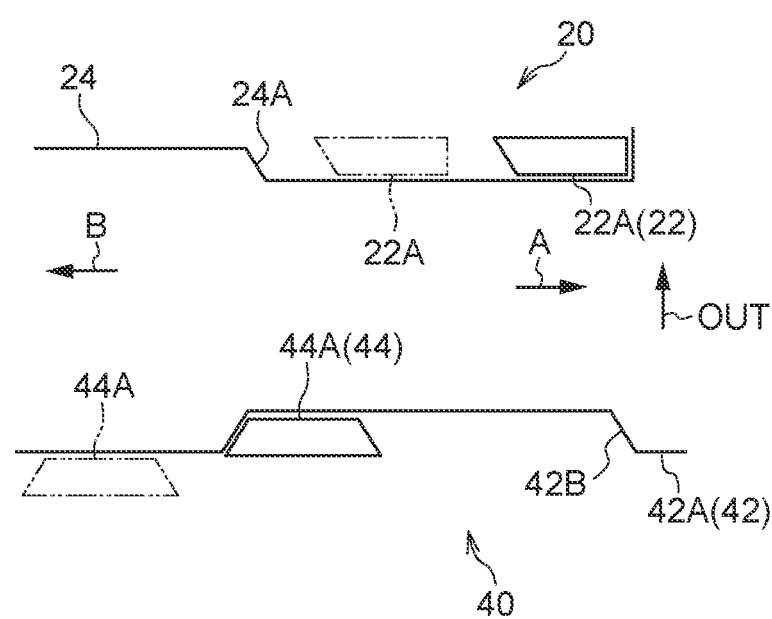
FIG. 3B is a sectional view showing main parts of the flow deflecting device pertaining to the embodiment of the disclosure and shows when the flow deflecting body is disposed in a deployed position.

Furthermore, when the flow deflecting body 14 in the retracted position is rotated in the retraction direction B due to action of an external force, the limiting projections 22A of the stand 22 become disengaged from the limiting recesses 24A of the case 24 in a state in which the rotational projections 44A of the clutch 44 are inserted into the rotational recesses 42B of the output gear 42 (see the long dashed double-short dashed lines in FIG. 3A). The rotational projections 44A do not become disengaged from the rotational recesses 42B, so the load for the flow deflecting body 14 to be rotated in the retraction direction B from the retracted position (the force counter to the biasing force of the compression coil spring 46) can be inhibited from becoming higher.

Moreover, when the flow deflecting body 14 in the retracted position is rotated in the retraction direction B due to action of an external force, the rotational projections 44A of the clutch 44 are rotated without being hindered by the rotational recesses 42B of the output gear 42 (the rotational recesses 42B allow rotation of the rotational projections 44A). For this reason, the load for the flow deflecting body 14 to be rotated in the retraction direction B from the retracted position can be effectively inhibited from becoming higher.

Furthermore, when the flow deflecting body 14 is disposed in the deployed position (see FIG. 3B), the rotational projections 44A of the clutch 44 are in abutment with the retraction direction B-side end surfaces of the rotational recesses 42B of the output gear 42 so that rotation of the clutch 44 in the retraction direction B is limited, whereby rotation of the flow deflecting body 14 in the retraction direction B is limited. Moreover, the limiting projections 22A of the stand 22 are in abutment with the deployment direction A-side end surfaces of the limiting recesses 24A of the case 24 so that rotation of the stand 22 in the deployment direction A is limited, whereby rotation of the flow deflecting body 14 in the deployment direction A is limited. Rotation of the flow deflecting body 14 in the deployment direction A and the retraction direction B from the deployed position can be limited, and rattling of the flow deflecting body 14 can be inhibited.

Moreover, when the flow deflecting body 14 is disposed in the retracted position (see FIG. 3A), the rotational projections 44A of the clutch 44 are in abutment with the deployment direction A-side end surfaces of the rotational recesses 42B of the output gear 42 so that rotation of the clutch 44 in the deployment direction A is limited, whereby rotation of the flow deflecting body 14 in the deployment direction A is limited. Moreover, the limiting projections 22A of the stand 22 are in abutment with the retraction direction B-side end surfaces of the limiting recesses 24A of the case 24 so that rotation of the stand 22 in the retraction direction B is limited, whereby rotation of the flow deflecting body 14 in the retraction direction B is limited. Rotation of the flow deflecting body 14 in the deployment direction A and the retraction direction B from the retracted position can be limited, and rattling of the flow deflecting body 14 can be inhibited.

In this embodiment, the stand 22 is provided with the limiting projections 22A and the case 24 is provided with the limiting recesses 24A. However, the stand 22 may be provided with the limiting recesses 24A and the case 24 may be provided with the limiting projections 22A. In this case, the retraction direction B-side surfaces of the limiting projections 22A and the retraction direction B-side end surfaces of the limiting recesses 24A may be perpendicular to the circumferential direction of the stand 22, and the deployment direction A-side surfaces of the limiting projections 22A and the deployment direction A-side end surfaces of the limiting recesses 24A may be inclined in a direction inward in the vehicle width direction heading in the deployment direction A.

Furthermore, in this embodiment, the output gear 42 is provided with the rotational recesses 42B and the clutch 44 is provided with the rotational projections 44A. However, the output gear 42 may be provided with the rotational projections 44A and the clutch 44 may be provided with the rotational recesses 42B.

What is claimed is:

1. A flow deflecting device comprising:
   a flow deflecting body configured to be rotated in a deployment direction so as to become deployed to a front side of a front wheel of a vehicle and reduce airflow to the front wheel, and configured to be rotated in a retraction direction so as to become retracted in a vehicle body;
   a rotational mechanism, whereby the flow deflecting body is rotatable in an engaged state at the rotational mechanism, such that in a case in which the flow deflecting body in a deployed position is acted upon by a first external force and engagement is released, the flow deflecting body is configured to be rotated in the retraction direction, and in a case in which the flow deflecting body in a retracted position is acted upon by a second external force, the flow deflecting body is rotated in the retraction direction in the engaged state at the rotational mechanism; and
   a limiting mechanism, whereby rotation of the flow deflecting body is limitable in an engaged state at the limiting mechanism, such that in a case in which the flow deflecting body in the retracted position is acted upon by the second external force and engagement is released, the flow deflecting body is configured to be rotated in the retraction direction, and in a case in which the flow deflecting body in the deployed position is acted upon by the first external force, the flow deflecting body is rotated in the retraction direction in the engaged state at the limiting mechanism.

2. The flow deflecting device of claim 1, wherein, in a state in which the flow deflecting body is disposed in the deployed position, the rotational mechanism limits rotation of the flow deflecting body in the retraction direction and the limiting mechanism limits rotation of the flow deflecting body in the deployment direction.

3. The flow deflecting device of claim 1, wherein, in a case in which the flow deflecting body is disposed in the retracted position, the rotational mechanism limits rotation of the flow deflecting body in the deployment direction and the limiting mechanism limits rotation of the flow deflecting body in the retraction direction.

4. The flow deflecting device of claim 2, wherein, in a case in which the flow deflecting body is disposed in the retracted position, the rotational mechanism limits rotation of the flow deflecting body in the deployment direction and the limiting mechanism limits rotation of the flow deflecting body in the retraction direction.

5. The flow deflecting device of claim 1, wherein, in a case in which the flow deflecting body in the deployed position is rotated in the retraction direction due to action of the first external force, the limiting mechanism allows rotation of the flow deflecting body.

6. The flow deflecting device of claim 2, wherein, in a case in which the flow deflecting body in the deployed position is rotated in the retraction direction due to action of the first external force, the limiting mechanism allows rotation of the flow deflecting body.

7. The flow deflecting device of claim 3, wherein, in a case in which the flow deflecting body in the deployed position is rotated in the retraction direction due to action of the first external force, the limiting mechanism allows rotation of the flow deflecting body.

8. The flow deflecting device of claim 1, wherein, in a case in which the flow deflecting body in the retracted position is rotated in the retraction direction due to action of the second external force, the rotational mechanism allows rotation of the flow deflecting body.

9. The flow deflecting device of claim 2, wherein, in a case in which the flow deflecting body in the retracted position is rotated in the retraction direction due to action of the second external force, the rotational mechanism allows rotation of the flow deflecting body.

10. The flow deflecting device of claim 3, wherein, in a case in which the flow deflecting body in the retracted position is rotated in the retraction direction due to action of the second external force, the rotational mechanism allows rotation of the flow deflecting body.

11. The flow deflecting device of claim 5, wherein, in a case in which the flow deflecting body in the retracted position is rotated in the retraction direction due to action of the second external force, the rotational mechanism allows rotation of the flow deflecting body.

12. The flow deflecting device of claim 1, wherein a rotation axis of the rotational mechanism and a rotation axis of the limiting mechanism are coaxial with each other.

* * * * *